(12) United States Patent
Pei et al.

(10) Patent No.: US 10,402,404 B2
(45) Date of Patent: Sep. 3, 2019

(54) SCHEDULING METHOD AND SYSTEM BASED ON HYBRID VARIABLE NEIGHBORHOOD SEARCH AND GRAVITATIONAL SEARCH ALGORITHM

(71) Applicant: Hefei University of Technology, Hefei, Anhui (CN)

(72) Inventors: Jun Pei, Anhui (CN); Wenjuan Fan, Anhui (CN); Xinbao Liu, Anhui (CN); Qiang Zhang, Anhui (CN); Min Kong, Anhui (CN); Shaojun Lu, Anhui (CN)

(73) Assignee: Hefei University of Technology, Hefei (CN)

( * ) Notice: Subject to any disclaimer, the term of this patent is extended or adjusted under 35 U.S.C. 154(b) by 0 days.

(21) Appl. No.: 16/127,337

(22) Filed: Sep. 11, 2018

(65) Prior Publication Data
US 2019/0079975 A1  Mar. 14, 2019

(30) Foreign Application Priority Data
Sep. 11, 2017  (CN) .......................... 2017 1 0824708

(51) Int. Cl.
*G06F 17/30* (2006.01)
*G06F 16/2453* (2019.01)
*G06F 9/48* (2006.01)

(52) U.S. Cl.
CPC ...... *G06F 16/24542* (2019.01); *G06F 9/4881* (2013.01); *Y02P 90/30* (2015.11)

(58) Field of Classification Search
None
See application file for complete search history.

(56) References Cited

FOREIGN PATENT DOCUMENTS

| | | | |
|---|---|---|---|
| CN | 103366021 A | 10/2013 | |
| CN | 103577900 A | 2/2014 | |
| CN | 103593719 A | 2/2014 | |

OTHER PUBLICATIONS

Sama et al, A variable neighborhood search for optimal scheduling and routing of take-off and landing aircraft, 2015, pp. 491-498.*

(Continued)

*Primary Examiner* — Alex Gofman
(74) *Attorney, Agent, or Firm* — Wayne & Ken, LLC; Tony Hom

(57) ABSTRACT

The present invention discloses a scheduling method and system based on a hybrid variable neighborhood search and gravitational search algorithm. The method includes: 1 setting parameters of the algorithm; 2 initializing an initial solution of the algorithm; 3 performing local search based on a gravitational search algorithm (GSA); 4 updating the initial solution; 5 determining whether an algorithm termination condition is satisfied; if yes, outputting the global optimal solution searched for by the algorithm, otherwise, returning to the step 3. According to the present invention, a near-optimal solution for the continuous batch processing problem based on position learning effect and linear starting time can be obtained, so that an enterprise can make full use of production resources thereof to the utmost extent, and thus reduce production costs and improve the enterprise service level and the customer satisfaction level.

7 Claims, 2 Drawing Sheets

(56) References Cited

OTHER PUBLICATIONS

Dong Hong yu et al , Review of Variable Neighborhood Search Algorithm , Jul. 31, 2009.
Pei Jun et al , Supply Chain Scheduling optimization problem based on integration of production and transportation , Nov. 30, 2012.
Jun Pei.et al , Serial-batching Scheduling with Time-dependent Setup Time and Effects of Deterioration and Learning on a Single-machine ,Jun. 7, 2015.

* cited by examiner ps/paper
SCHEDULING METHOD AND SYSTEM BASED ON HYBRID VARIABLE NEIGHBORHOOD SEARCH AND GRAVITATIONAL SEARCH ALGORITHM

CROSS-REFERENCE TO RELATED APPLICATIONS

This application claims to Chinese application No. 201710824708.2 with a filing date of Sep. 11, 2017. The content of the aforementioned applications, including any intervening amendments thereto, are incorporated herein by reference.

TECHNICAL FIELD

The present invention relates to the technical field of software, and more particularly, to a scheduling method and system based on a hybrid variable neighborhood search and gravitational search algorithm, and a storage medium.

BACKGROUND OF THE PRESENT INVENTION

In the actual process of manufacturing aluminum products in an aluminum plant, cylindrical aluminum ingots are processed on an extruding machine. This extruding machine is in fact a batch processing machine, serving to process jobs one after another in each batch. Considering the actual production situation, there is a necessary period of setup time varying over time when processing each batch of aluminum ingots. In addition, the production efficiency will be improved continuously over time, i.e., the actual processing time of an aluminum ingot depends on the positions thereof or a sequential position of the batch holding the aluminum ingot. That is to say, if an aluminum ingot is processed later, it will take less time to complete the extrusion of the aluminum ingot. It thus can be seen that the processing time of an aluminum ingot can be expressed as a decreasing function related to its position. In this production scenario, the configurations of a single machine and parallel machines have different production requirements. Therefore, the scheduling system provides corresponding solving strategies for actual production scheduling circumstances in two cases of a single machine and parallel machines. The variable neighborhood search (VNS) algorithm was put forward by Mladenovic and Hansen in 1997, while the gravitational algorithm, also an efficient optimization algorithm, was initially put forward in 2009. In recent years, many scholars have made extensive studies on such algorithms and applied them in many practical combinatorial optimization problems.

However, during the process of invention-creation, the inventor has found that the prior art has some disadvantages as follows: (1) with regard to study, in one aspect, studies were reported in previous documents with consideration of fixed processing time. In actual conditions, the actual processing time of a job and the setup time of a batch are usually related to the position of the job and the starting setup time of the batch due to the deterioration and learning effect of a machine. In another aspect, it is rarely found that a document and a method have involved a parallel machine processing system with deterioration and learning considerations, especially with maximum lead time as the optimization objective, and this problem may decide the production efficiency and service quality of an enterprise in some actual applications. (2) With regard to study method, factors influencing the performance of the VNS algorithm mainly include the quality of an initial solution, a neighborhood structure, and a search strategy in the neighborhood structure. In some cases, the limitations of the initial solution and the neighborhood structure may cause the VNS algorithm to plunge into local optimum early, and consequently, it is impossible to obtain a good scheduling scheme.

SUMMARY OF THE PRESENT INVENTION

The present invention provides a scheduling method and system based on a hybrid variable neighborhood search and gravitational search algorithm and a storage medium to solve at least one of the above technical problems.

In a first aspect, an embodiment of the present invention provides a scheduling method based on a hybrid variable neighborhood search and gravitational search algorithm. The method is executed by a computer and includes:

S1, initializing input parameters of the algorithm, including number of jobs n, basic processing time of a job $p_i$, learning factor a, linear factor of starting time $\theta$, and capacity of a processing machine C;

S2, setting execution parameters of an improved variable neighborhood search (VNS) algorithm, wherein the VNS algorithm part includes initial solution $X_s$, maximum iterations $I_{max}$, minimum neighborhood structure index value $o_{min}$, current neighborhood structure index value o, and maximum neighborhood structure index value $o_{max}$; and a local search algorithm part includes maximum iterations $it_{max}$, current iteration it=1, and population size of the local search algorithm Q, with global optimal solution $X_{best}=X_s$;

S3, setting $o=o_{min}$;

S4, randomly selecting Q individuals from the oth neighborhood of the current global optimal solution $X_{best}$ to initialize a population individual set S in local search based on the local search algorithm;

S5, executing the local search algorithm to obtain a local near-optimal solution X';

S6, when determining that X' is better than the current global optimal solution $X_{best}$, assigning X' to $X_{best}$, and proceeding to the step S3; otherwise, assigning o+1 to o, and determining whether o is not greater than $o_{max}$, and if yes, proceeding to the step S4; otherwise, proceeding to step S7; and S7, assigning I+1 to I, and determining whether I≤$I_{max}$ is true; if yes, performing the step S3; otherwise, terminating the algorithm, and outputting the current global optimal solution.

Before the step of randomly selecting Q individuals from the oth neighborhood of the current global optimal solution $X_{best}$ in the step S4, the method further includes: setting a neighborhood structure;

wherein setting the neighborhood structure includes:

step S1', defining variables x, y, and g=1, and obtaining the input initial solution X and variable o;

step S2', randomly generating two integers in the range of an interval [1, n] for assigning to x and y;

step S3', selecting the xth and yth elements in X, and swapping the two elements to obtain a new solution X';

step S4', let g=g+1, determining whether g≤o is true; if yes, returning to the step S2'; otherwise, performing step S5';

step S5', calculating a fitness value, and determining whether X' is better than the initial solution X; if yes, outputting the solution X'; otherwise, outputting the initial solution X.

In a second aspect, an embodiment of the present invention provides a scheduling system based on a hybrid variable neighborhood search and gravitational search algorithm. The system includes a computer including:
- at least one storage unit;
- at least one processing unit; and
- at least one output unit;

The at least one storage unit stores at least one instruction to be loaded and executed by the at least one processing unit to implement the following steps:

S1, initializing input parameters of the algorithm, including number of jobs n, basic processing time of a job $p_i$, learning factor a, linear factor of starting time θ, and capacity of a processing machine C;

S2, setting execution parameters of an improved variable neighborhood search (VNS) algorithm, wherein the VNS algorithm part includes initial solution $X_s$, maximum iterations $I_{max}$, minimum neighborhood structure index value $o_{min}$, current neighborhood structure index value o, and maximum neighborhood structure index value $o_{max}$; and a local search algorithm part includes maximum iterations $it_{max}$, current iteration it=1, and population size of the local search algorithm Q, with global optimal solution $X_{best}=X_s$;

S3, setting $o=o_{min}$;

S4, randomly selecting Q individuals from the oth neighborhood of the current global optimal solution $X_{best}$ to initialize a population individual set S in local search based on the local search algorithm;

S5, executing the local search algorithm to obtain a local near-optimal solution X';

S6, when determining that X' is better than the current global optimal solution $X_{best}$, assigning X' to $X_{best}$, and proceeding to the step S3; otherwise, assigning o+1 to o, and determining whether o is not greater than $o_{max}$, and if yes, proceeding to the step S4; otherwise, proceeding to step S7; and S7, assigning I+1 to I, and determining whether I≤$I_{max}$ is true; if yes, performing the step S3; otherwise, terminating the algorithm.

The at least one output unit is configured to output the current global optimal solution.

Before the step of randomly selecting Q individuals from the oth neighborhood of the current global optimal solution $X_{best}$ in the step S4 implemented through loading and execution of the at least one instruction by the at least one processing unit, a step of setting a neighborhood structure is further performed;

wherein setting the neighborhood structure includes:

step S1', defining variables x, y, and g=1, and obtaining the input initial solution X and variable o;

step S2', randomly generating two integers in the range of an interval [1, n] for assigning to x and y;

step S3', selecting the xth and yth elements in X, and swapping the two elements to obtain a new solution X';

step S4', let g=g+1, determining whether g≤o is true; if yes, returning to the step S2'; otherwise, performing step S5'; and step S5', calculating a fitness value, and determining whether X' is better than the initial solution X; if yes, outputting the solution X'; otherwise, outputting the initial solution X.

In a third aspect, the present invention provides a computer-readable storage medium that stores at least one instruction to be loaded and executed by a processor to implement the above method.

According to the present invention, a near-optimal solution for the continuous batch processing problem based on position learning effect and linear starting time can be obtained, so that an enterprise can make full use of production resources thereof to the utmost extent, and thus reduce production costs and improve the enterprise service level and the customer satisfaction level.

BRIEF DESCRIPTION OF THE DRAWINGS

Various other advantages and benefits will become obvious for those of ordinary skill in the art from the following detailed descriptions of preferred embodiments. The accompanying drawings are merely intended to illustrate the preferred embodiments rather than limit the invention. Furthermore, like reference numerals indicate like components throughout the drawings in which.

DETAILED DESCRIPTION OF THE PRESENT INVENTION

Technical solutions in the embodiments of the present invention will be described clearly and fully below in combination with the drawings accompanying the embodiments of the present invention. It is apparent that the described embodiments are merely part of embodiments of the present invention, rather than all. Other embodiments achieved by those of ordinary skill in the art based on the embodiments in the present invention without creative work shall all fall into the scope of protection of the present invention.

The embodiments of the present invention are meant to solve the production scheduling problem under the circumstance of continuous batch processing with parallel machines. In this problem, jobs differ in general processing time, and the actual processing time of a job is related to its position. A batch has setup time related to starting time. The optimization objective is to minimize the maximum lead time. Based on the characteristics of the problem, an effective intelligent algorithm is developed to solve the combinatorial optimization problem, thereby promoting improvement of the production efficiency of an enterprise, achieving precision production and improving the customer satisfaction level.

For the convenience of understanding, the problems to be solved by the embodiments of the present invention are explained in detail first below.

(1) A set of jobs to be processed is denoted as J= $\{J_1, \ldots, J_i, \ldots, J_n\}$, and the general processing time of job $J_i$ is denoted as $p_i$.

(2) Processing machines are a plurality of identical continuous batch processing machines. The capacity of each processing machine is the same and denoted as C. Jobs are assigned to the processing machines for processing in batches. It is stipulated that the total number of jobs in each batch cannot exceed C.

(3) The processing time of a batch is decided by the total processing time of all jobs in the batch. Once a particular batch is formed, it is prohibited to remove a job out of this batch and add a new job to the batch.

(4) Since enterprises and customers have increasingly high requirements on precision production and zero inventory management, the optimization objective is set to minimize the maximum advanced completion time of jobs.

A set of job batches assigned to processing machine k is denoted as $B_k$. The completion time $C_k$ of the machine k is decided by the last batch. The completion time $C_{b_{kj}}$ of the current batch $b_{kj}$ is equal to the sum of the completion time of the previous batch and the processing time of the current batch, i.e., $C_{b_{kj}} = C_{b_{kj-1}} + P_{b_{kj}}/v_k$. The completion time $C_k$ of machine k is decided by the last processed batch, i.e., $C_k = \max\{C_{b_{kj}} | b_{kj} \in B_k\} + r_k$.

Figure 1:
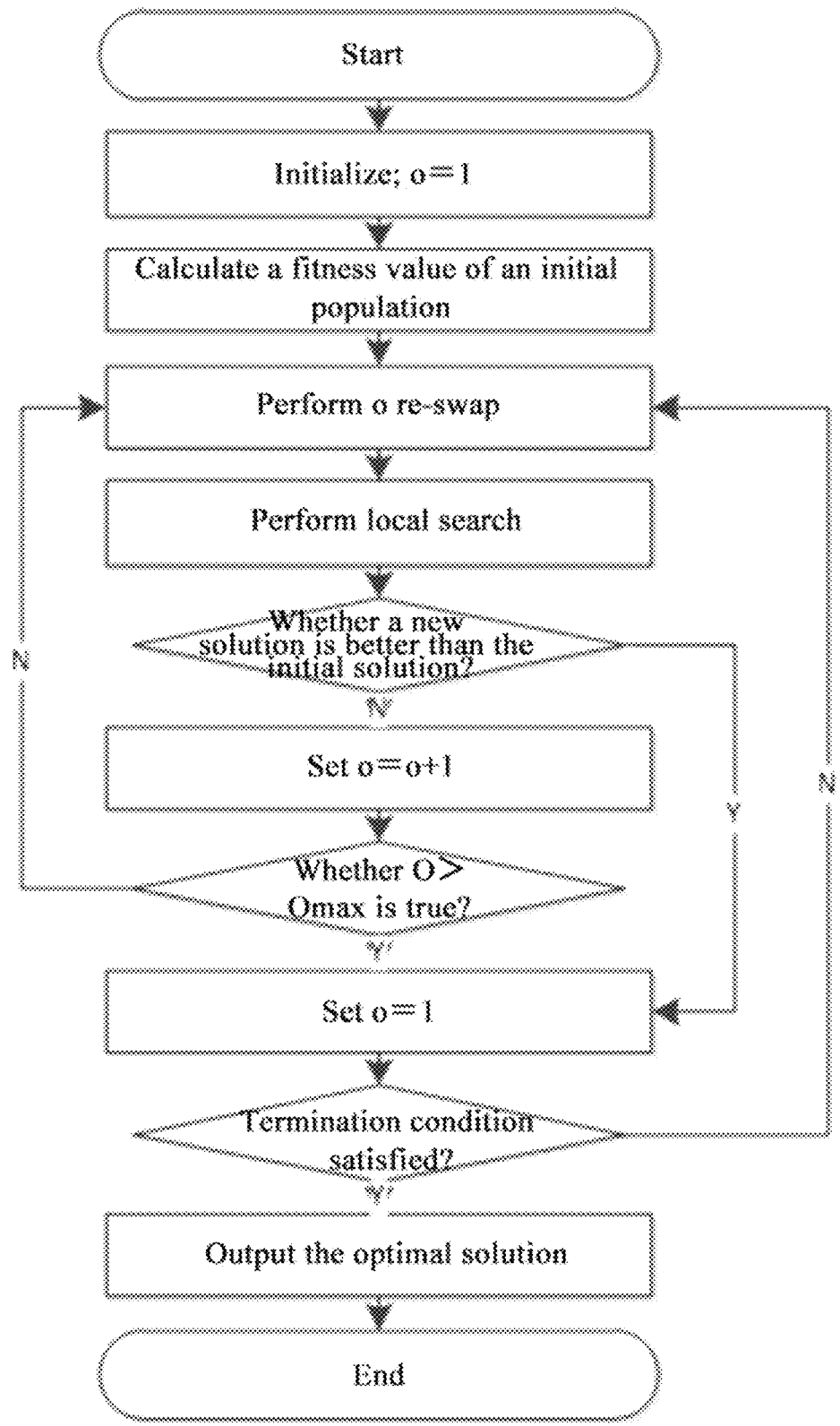
FIG. 1 is a flowchart of a scheduling method based on a hybrid variable neighborhood search and gravitational search algorithm in accordance with an embodiment of the present invention.

(5) After the completion of processing of jobs on each machine, the jobs must be transported to the customer. The time needed for the jobs on machine k to arrive at the customer is denoted as $T_k$. The optimization objective of the problem is the makespan from the start of the production task to final delivery to the customer $C_{max} = \max\{C_k + T_k | k=1, \ldots, m\}$ On this basis, one embodiment of the present invention provides a scheduling method based on a hybrid variable neighborhood search and gravitational search algorithm. The method is executed by a computer, as shown in FIG. 1, and includes:

S1, initializing input parameters of the algorithm, including number of jobs n, basic processing time of a job $p_i$, learning factor a, linear factor of starting time θ, and capacity of a processing machine C;

S2, setting execution parameters of an improved variable neighborhood search (VNS) algorithm, wherein the VNS algorithm part includes initial solution $X_s$, maximum iterations $I_{max}$, minimum neighborhood structure index value $o_{min}$, current neighborhood structure index value o, and maximum neighborhood structure index value $o_{max}$; and a local search algorithm part includes maximum iterations $it_{max}$, current iteration it=1, and population size of the local search algorithm Q, with global optimal solution $X_{best} = X_s$;

S3, setting $o = o_{min}$;

S4, randomly selecting Q individuals from the oth neighborhood of the current global optimal solution $X_{best}$ to initialize a population individual set S in local search based on the local search algorithm;

S5, executing the local search algorithm to obtain a local near-optimal solution X';

S6, when determining that X' is better than the current global optimal solution $X_{best}$, assigning X' to $X_{best}$, and proceeding to the step S3; otherwise, assigning o+1 to o, and determining whether o is not greater than $o_{max}$, and if yes, proceeding to the step S4; otherwise, proceeding to step S7; and S7, assigning I+1 to I, and determining whether $I \leq I_{max}$ is true; if yes, performing the step S3; otherwise, terminating the algorithm.

According to the present invention, a near-optimal solution for the continuous batch processing problem based on position learning effect and linear starting time can be obtained, so that an enterprise can make full use of production resources thereof to the utmost extent, and thus reduce production costs and improve the enterprise service level and the customer satisfaction level.

In specific implementation, before the step of randomly selecting Q individuals from the oth neighborhood of the current global optimal solution $X_{best}$ in the step S4, the method may further include: setting a neighborhood structure, wherein setting the neighborhood structure may include:

step S1', defining variables x, y, and g=1, and obtaining the input initial solution X and variable o;

step S2', randomly generating two integers in the range of an interval [1, n] for assigning to x and y;

step S3', selecting the xth and yth elements in X, and swapping the two elements to obtain a new solution X';

step S4', let g=g+1, determining whether g≤o is true; if yes, returning to the step S2'; otherwise, performing step S5'; and step S5', calculating a fitness value, and determining whether X' is better than the initial solution X; if yes, outputting the solution X'; otherwise, outputting the initial solution X.

In specific implementation, executing the local search algorithm to obtain the local near-optimal solution X' in the step S5 may include:

step S51, randomly selecting Q solutions in a neighborhood of the current global optimal solution as initial solutions of the local search algorithm based on a gravitational search algorithm (GSA), wherein the jth individual in the (it)th generation population of the local search algorithm is defined as $X_j^{it} = \{x_{j1}^{it}, x_{j2}^{it}, \ldots, x_{jd}^{it}, \ldots, x_{jn}^{it}\}$, with $1 \leq it \leq it_{max}$, $j=1, 2, \ldots, Q$, and $d=1, 2, \ldots, n$, wherein $x_{jd}^{it}$ represents the position of the jth individual in the (it)th generation population in the dth dimension; and let it=1;

step S52, calculating a fitness value of each individual in the (it)th generation population, wherein the fitness value of the jth individual is denoted as $fit_j(it)$;

step S53, updating the worst individual worst(it) and the best individual best(it) of the (it)th generation population;

step S54, calculating the mass of each individual of the current population by the following equations, wherein $M_j(it)$ represents the mass of the jth individual of the current population;

$$m_j(it) = \frac{fit_j - worst(it)}{best(it) - worst(it)}$$

$$M_j(it) = \frac{m_j(it)}{\sum_{j=1}^{Q} m_j(it)};$$

step S55, calculating an acceleration of each individual of the current population in each dimension by the following equations, wherein the acceleration of the jth individual in the dth dimension is denoted as $A_{jd}^{it}$;

$$F_{ij}^d(it) = G(it) \frac{M_j(it) \times M_i(it)}{\|X_j^{it} - X_i^{it}\|_2 + \varepsilon} (x_{jd}^{it} - x_{id}^{it})$$

$$A_{jd}^{it} = \frac{\sum_{i=1,i \neq j}^{N} rand_i F_{ij}^d(it)}{M_j(it)};$$

step S56, updating a position and a speed of each individual of the current population in each dimension by the following equations, wherein the speed of the jth individual in the dth dimension is denoted as $V_{jd}^{it}$;

$$V_{jd}^{it+1} = rand_j \times V_{jd}^{it} + A_{jd}^{it}$$

$$x_{jd}^{it+1} = x_{jd}^{it} + V_{jd}^{it+1}; \text{ and}$$

step S57, determining whether $it \leq it_{max}$ is true; if yes, let it=it+1, and proceeding to step S52; otherwise, terminating the algorithm, and outputting the local near-optimal solution.

In specific implementation, calculating the fitness value may include:

step S1", sorting a job sequence in a non-decreasing order by processing time, and setting parameter h=1;

step S2", arranging first c jobs of the sequence into the hth batch, and deleting such jobs from a list, thereby obtaining a remaining sequence, and assigning h+1 to h;

step S3", if there still are jobs left in the job sequence, arranging first $$n - \left(\left\lceil \frac{n}{c} \right\rceil - 1\right)c$$

jobs into the hth batch, and deleting such jobs from the list, thereby obtaining a remaining sequence;

step S4", assigning h+1 to h;

step S5", if there still are jobs left in the sequence, arranging first c jobs into the hth batch, and deleting such jobs from the list, thereby obtaining a remaining sequence, and then returning the step S4"; otherwise, performing step S6";

step S6", processing each batch in a batch forming order, and calculating the maximum lead time max $E_{max}^*$:

if n<c is true, $E_{max}^*$=0;

otherwise, $$E_{max}^* = d - \frac{1}{(1+\theta)^{\lceil \frac{n}{c} \rceil - 1}} \left[ d - \left( \sum_{r=c+1}^{c+n-(\lceil \frac{n}{c} \rceil-1)c} \sum_{i=1}^{n} p_i t^a x_{ir}(1+\theta)^{\lceil \frac{n}{c} \rceil-2} + \sum_{k=3}^{\lceil \frac{n}{c} \rceil} \sum_{r=c+n-(\lceil \frac{n}{c} \rceil-1)c+(k-3)c+1}^{c+n-(\lceil \frac{n}{c} \rceil-1)c+(k-3)c+c} \sum_{i=1}^{n} p_i t^a x_{ir}(1+\theta)^{\lceil \frac{n}{c} \rceil-k} \right) \right];$$

wherein θ represents a setup time deterioration rate; n represents total number of jobs; c represents the capability of a machine, i.e., maximum number of jobs of each batch; and ⌈x⌉ represents the maximum integer not greater than x;

$$x_{ir} = \begin{cases} 0, & \text{representing that the } ith \text{ job is not processed in the } rth \text{ batch} \\ 1, & \text{representing that the } ith \text{ job is processed in the } rth \text{ batch} \end{cases};$$

and step S7", calculating the optimal maximum lead time $E_{max}^*$ on each machine according to the steps S1"-S6", and outputting the maximum of $E_{max}^*$ calculated among all machines as the fitness value $E_{max}$.

Figure 2:
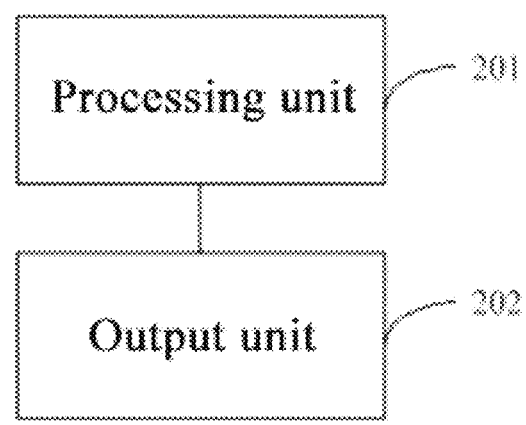
FIG. 2 is a structure diagram of a scheduling system based on a hybrid variable neighborhood search and gravitational search algorithm in accordance with an embodiment of the present invention.

Based on the same inventive concept, another embodiment of the present invention provides a scheduling system based on a hybrid variable neighborhood search and gravitational search algorithm. As shown in FIG. 2, the scheduling system includes a computer including:

at least one storage unit 201;
at least one processing unit 202; and
at least one output unit (not shown in the figure).

The processing unit may be, for example, a processor. The storage unit may be, for example, a memory. The output unit may be, for example, an output device formed by a data interface and a data cable. The output unit can output data to a display screen, other electronic devices and the like.

The at least one storage unit stores at least one instruction to be loaded and executed by the at least one processing unit to implement the following steps:

S1, initializing input parameters of the algorithm, including number of jobs n, basic processing time of a job $p_i$, learning factor a, linear factor of starting time θ, and capacity of a processing machine C;

S2, setting execution parameters of an improved variable neighborhood search (VNS) algorithm, wherein the VNS algorithm part includes initial solution $X_s$, maximum iterations $I_{max}$, minimum neighborhood structure index value $o_{min}$, current neighborhood structure index value o, and maximum neighborhood structure index value $o_{max}$; and a local search algorithm part includes maximum iterations $it_{max}$, current iteration it=1, and population size of the local search algorithm Q, with global optimal solution $X_{best}=X_s$;

S3, setting o=$o_{min}$;

S4, randomly selecting Q individuals from the oth neighborhood of the current global optimal solution $X_{best}$ to initialize a population individual set S in local search based on the local search algorithm;

S5, executing the local search algorithm to obtain a local near-optimal solution X';

S6, when determining that X' is better than the current global optimal solution $X_{best}$, assigning X' to $X_{best}$, and proceeding to the step S3; otherwise, assigning o+1 to o, and determining whether o is not greater than $o_{max}$ and if yes, proceeding to the step S4; otherwise, proceeding to step S7; and S7, assigning I+1 to I, and determining whether I≤$I_{max}$ is true; if yes, performing the step S3; otherwise, terminating the algorithm;

The at least one output unit 202 is configured to output the current global optimal solution.

Before the step of randomly selecting Q individuals from the oth neighborhood of the current global optimal solution $X_{best}$ in the step S4 implemented through loading and execution of the at least one instruction by the at least one processing unit 201, a step of setting a neighborhood structure is further performed, wherein setting the neighborhood structure may include:

step S1', defining variables x, y, and g=1, and obtaining the input initial solution X and variable o;

step S2', randomly generating two integers in the range of an interval [1, n] for assigning to x and y;

step S3', selecting the xth and yth elements in X, and swapping the two elements to obtain a new solution X';

step S4', let g=g+1, determining whether g≤o is true; if yes, returning to the step S2'; otherwise, performing step S5'; and step S5', calculating a fitness value, and determining whether X' is better than the initial solution X; if yes, outputting the solution X'; otherwise, outputting the initial solution X.

Alternatively, the at least one processing unit 201 executes the local search algorithm to obtain the local near-optimal solution X', which may specifically include:

step S51, randomly selecting Q solutions in a neighborhood of the current global optimal solution as initial solutions of the local search algorithm based on a gravitational search algorithm (GSA), wherein the jth individual in the (it)th generation population of the local search algorithm is defined as $X_j^{it}=\{x_{j1}^{it}, x_{j2}^{it}, \ldots, x_{jd}^{it}, \ldots, x_{jn}^{it}\}$, with 1≤it≤$it_{max}$, j=1, 2, . . . , Q, and d=1, 2 . . . , n, wherein $x_{jd}^{it}$ represents the position of the jth individual in the (it)th generation population in the dth dimension; and let it=1;

step S52, calculating a fitness value of each individual in the (it)th generation population, wherein the fitness value of the jth individual is denoted as fit$_j$(it);

step S53, updating the worst individual worst(it) and the best individual best(it) of the (it)th generation population;

step S54, calculating the mass of each individual of the current population by the following equations, wherein M$_j$(it) represents the mass of the jth individual of the current population;

$$m_j(it) = \frac{fit_j - worst(it)}{best(it) - worst(it)}$$

$$M_j(it) = \frac{m_j(it)}{\sum_{j=1}^{Q} m_j(it)};$$

step S55, calculating an acceleration of each individual of the current population in each dimension by the following equations, wherein the acceleration of the jth individual in the dth dimension is denoted as $A_{jd}^{it}$ $$F_{ij}^d(it) = G(it) \frac{M_j(it) \times M_i(it)}{\|X_j^{it} - X_i^{it}\|_2 + \varepsilon}(x_{jd}^{it} - x_{id}^{it})$$

$$A_{jd}^{it} = \frac{\sum_{i=1, i \neq j}^{N} rand_i F_{ij}^d(it)}{M_j(it)};$$

step S56, updating a position and a speed of each individual of the current population in each dimension by the following equations, wherein the speed of the jth individual in the dth dimension is denoted as $V_{jd}^{it}$;

$$V_{jd}^{it+1} = rand_j \times V_{jd}^{it} + A_{jd}^{it}$$

$$x_{jd}^{it+1} = x_{jd}^{it} + V_{jd}^{it+1}; \text{ and}$$

step S57, determining whether it≤it$_{max}$ is true; if yes, let it=it+1, and proceeding to step S52; otherwise, terminating the algorithm, and outputting the local near-optimal solution.

Alternatively, the at least one processing unit 201 calculates the fitness value, which may specifically include:

step S1", sorting a job sequence in a non-decreasing order by processing time, and setting parameter h=1;

step S2", arranging first c jobs of the sequence into the hth batch, and deleting such jobs from a list, thereby obtaining a remaining sequence, and assigning h+1 to h;

step S3", if there still are jobs left in the job sequence, arranging first $$n - \left(\left\lceil \frac{n}{c} \right\rceil - 1\right) c$$

jobs into the hth batch, and deleting such jobs from the list, thereby obtaining a remaining sequence;

step S4", assigning h+1 to h;

step S5", if there still are jobs left in the sequence, arranging first c jobs into the hth batch, and deleting such jobs from the list, thereby obtaining a remaining sequence, and then returning the step S4"; otherwise, performing step S6";

step S6", processing each batch in a batch forming order, and calculating the maximum lead time E$_{max}$*;

if n<c is true, E$_{max}$*=0;

otherwise, $$E_{max}^* = d - \frac{1}{(1+\theta)^{\lceil \frac{n}{c} \rceil - 1}} \left[ d - \left( \sum_{r=c+1}^{c+n-(\lceil \frac{n}{c} \rceil - 1)c} \sum_{i=1}^{n} p_i i^a x_{ir}(1+\theta)^{\lceil \frac{n}{c} \rceil - 2} + \sum_{k=3}^{\lceil \frac{n}{c} \rceil} \sum_{r=c+n-(\lceil \frac{n}{c} \rceil - 1)c+(k-3)c+1}^{c+n-(\lceil \frac{n}{c} \rceil - 1)c+(k-3)c+c} \sum_{i=1}^{n} p_i i^a x_{ir}(1+\theta)^{\lceil \frac{n}{c} \rceil - k} \right) \right];$$

wherein θ represents a setup time deterioration rate; n represents total number of jobs; c represents the capability of a machine, i.e., maximum number of jobs of each batch; and ⌈x⌉ represents the maximum integer not greater than x;

$$x_{ir} = \begin{cases} 0, \text{ representing that the } ith \text{ job is not processed in the } rth \text{ batch} \\ 1, \text{ representing that the } ith \text{ job is processed in the } rth \text{ batch} \end{cases};$$

and step S7", calculating the optimal maximum lead time E$_{max}$* on each machine according to the steps S1"-S6", and outputting the maximum of E$_{max}$* calculated among all machines as the fitness value E$_{max}$.

Since the scheduling system based on the hybrid variable neighborhood search and gravitational search algorithm introduced in this embodiment can execute the scheduling method based on the hybrid variable neighborhood search and gravitational search algorithm according to the embodiment of the present invention, those skilled in the art can understand specific embodiments of the scheduling system based on the hybrid variable neighborhood search and gravitational search algorithm according to this embodiment and various variations thereof on the basis of the scheduling method based on the hybrid variable neighborhood search and gravitational search algorithm introduced in the embodiment of the present invention. Thus, how the scheduling system based on the hybrid variable neighborhood search and gravitational search algorithm implements the scheduling method based on the hybrid variable neighborhood search and gravitational search algorithm in the embodiment of the present invention will not be introduced in detail herein. Any implementation of the system employed in the scheduling method based on the hybrid variable neighborhood search and gravitational search algorithm in the embodiment of the present invention by those skilled in the art shall fall into the scope of protection of the present application.

An embodiment of the present invention also provides a computer-readable storage medium that stores at least one instruction to be loaded and executed by a processor to implement the above scheduling method.

Numerous specific details are provided in the description herein. However, it can be understood that the embodiments of the present disclosure may be practiced without these specific details. In some examples, well-known methods, structures and techniques are not shown in detail in order not to obscure the understanding of this description.

Similarly, it should be appreciated that in the foregoing descriptions of the example embodiments of the present disclosure, various features of the present disclosure are sometimes grouped together in a single embodiment, figure, or description thereof for the purpose of streamlining the present disclosure and aiding in the understanding of one or more of the various inventive aspects. However, the method of the present disclosure is not to be interpreted as reflecting an intention that the claimed disclosure requires more features that are expressly contained in each claim. Rather, as the following claims reflect, inventive subject matter lies in less than all features of a single embodiment as disclosed above. Thus, the claims following the detailed description are hereby expressly incorporated into the detailed description, with each claim standing on its own as a separate embodiment of the present disclosure.

What is claimed is:

1. A scheduling method based on a hybrid variable neighborhood search and gravitational search algorithm, the method being executed by a computer and comprising:
    S1, initializing input parameters of the algorithm, including number of jobs n, basic processing time of a job $p_i$, learning factor a, linear factor of starting time θ, and capacity of a processing machine C;
    S2, setting execution parameters of an improved variable neighborhood search (VNS) algorithm, wherein the VNS algorithm part comprises initial solution $X_s$, maximum iterations $I_{max}$, minimum neighborhood structure index value $o_{min}$, current neighborhood structure index value o, and maximum neighborhood structure index value $o_{max}$; and a local search algorithm part comprises maximum iterations $it_{max}$, current iteration it=1, and population size of the local search algorithm Q, with global optimal solution $X_{best}=X_s$;
    S3, setting o=$o_{min}$;
    S4, randomly selecting Q individuals from the oth neighborhood of the current global optimal solution $X_{best}$ to initialize a population individual set S in local search based on the local search algorithm;
    S5, executing the local search algorithm to obtain a local near-optimal solution X';
    S6, when determining that X' is better than the current global optimal solution $X_{best}$, assigning X' to $X_{best}$, and proceeding to the step S3; otherwise, assigning o+1 to o, and determining whether o is not greater than $o_{max}$, and if yes, proceeding to the step S4; otherwise, proceeding to step S7; and
    S7, assigning I+1 to I, and determining whether I≤$I_{max}$ is true; if yes, performing the step S3; otherwise, terminating the algorithm, and outputting the current global optimal solution;
    before the step of randomly selecting Q individuals from the oth neighborhood of the current global optimal solution $X_{best}$ in the step S4, the method further comprising: setting a neighborhood structure;
    wherein the setting the neighborhood structure comprises:
    step S1', defining variables x, y, and g=1, and obtaining the input initial solution X and variable o;
    step S2', randomly generating two integers in the range of an interval [1, n] for assigning to x and y;
    step S3', selecting the xth and yth elements in X, and swapping the two elements to obtain a new solution X';
    step S4', let g=g+1, determining whether g≤o is true; if yes, returning to the step S2'; otherwise, performing step S5'; and
    step S5', calculating a fitness value, and determining whether X' is better than the initial solution X; if yes, outputting the solution X'; otherwise, outputting the initial solution X.

2. The method according to claim 1, wherein executing the local search algorithm to obtain the local near-optimal solution X' in the step S5 comprises:
    step S51, randomly selecting Q solutions in a neighborhood of the current global optimal solution as initial solutions of the local search algorithm based on a gravitational search algorithm (GSA), wherein the jth individual in the (it)th generation population of the local search algorithm is defined as $X_j^{it}=\{x_{j1}^{it}, x_{j2}^{it}, \ldots, x_{jd}^{it}, \ldots, x_{jn}^{it}\}$, with 1≤it≤$it_{max}$, j=1, 2, ..., Q, and d=1, 2 ..., n, wherein $x_{jd}^{it}$ represents the position of the jth individual in the (it)th generation population in the dth dimension; and let it=1;
    step S52, calculating a fitness value of each individual in the (it)th generation population, wherein the fitness value of the jth individual is denoted as $fit_j(it)$;
    step S53, updating the worst individual worst(it) and the best individual best(it) of the (it)th generation population;
    step S54, calculating the mass of each individual of the current population by the following equations, wherein $M_j(it)$ represents the mass of the jth individual of the current population;

$$m_j(it) = \frac{fit_j - worst(it)}{best(it) - worst(it)}$$

$$M_j(it) = \frac{m_j(it)}{\sum_{j=1}^{Q} m_j(it)};$$

step S55, calculating an acceleration of each individual of the current population in each dimension by the following equations, wherein the acceleration of the jth individual in the dth dimension is denoted as $A_{jd}^{it}$;

$$F_{ij}^d(it) = G(it)\frac{M_j(it) \times M_i(it)}{\|X_j^{it} - X_i^{it}\|_2 + \varepsilon}(x_{jd}^{it} - x_{id}^{it})$$

$$A_{jd}^{it} = \frac{\sum_{i=1, i \neq j}^{N} rand_i F_{ij}^d(it)}{M_j(it)};$$

step S56, updating a position and a speed of each individual of the current population in each dimension by the following equations, wherein the speed of the jth individual in the dth dimension is denoted as $V_{jd}^{it}$;

$$V_{jd}^{it+1} = rand_j \times V_{jd}^{it} + A_{jd}^{it}$$

$$x_{jd}^{it+1} = x_{jd}^{it} + V_{jd}^{it+1}; \text{ and}$$

step S57, determining whether it≤$it_{max}$ is true; if yes, let it=it+1, and proceeding to step S52; otherwise, terminating the algorithm, and outputting the local near-optimal solution.

3. The method according to claim 1, wherein calculating the fitness value comprises:
    step S1", sorting a job sequence in a non-decreasing order by processing time, and setting parameter h=1;
    step S2", arranging first c jobs of the sequence into the hth batch, and deleting such jobs from a list, thereby obtaining a remaining sequence, and assigning h+1 to h;

step S3", if there still are jobs left in the job sequence, arranging first $$n - \left(\left\lceil \frac{n}{c} \right\rceil - 1\right) c$$

jobs into the hth batch, and deleting such jobs from the list, thereby obtaining a remaining sequence;
  step S4", assigning h+1 to h;
  step S5", if there still are jobs left in the sequence, arranging first c jobs into the hth batch, and deleting such jobs from the list, thereby obtaining a remaining sequence, and then returning the step S4"; otherwise, performing step S6";
  step S6", processing each batch in a batch forming order, and calculating the maximum lead time $E_{max}$*;
  if n<c is true, $E_{max}$*=0;
  otherwise, $$E_{max}^* = d - \frac{1}{(1+\theta)^{\lceil \frac{n}{c} \rceil - 1}} \left[ d - \left( \sum_{r=c+1}^{c+n-(\lceil \frac{n}{c} \rceil - 1)c} \sum_{i=1}^{n} p_i r^a x_{ir} (1+\theta)^{\lceil \frac{n}{c} \rceil - 2} + \sum_{k=3}^{\lceil \frac{n}{c} \rceil} \sum_{r=c+n-(\lceil \frac{n}{c} \rceil - 1)c+(k-3)c+1}^{c+n-(\lceil \frac{n}{c} \rceil - 1)c+(k-3)c+c} \sum_{i=1}^{n} p_i r^a x_{ir} (1+\theta)^{\lceil \frac{n}{c} \rceil - k} \right) \right];$$

wherein θ represents a setup time deterioration rate; n represents total number of jobs; c represents the capability of a machine, i.e., maximum number of jobs of each batch; and ⌈x⌉ represents the maximum integer not greater than x; and $$x_{ir} = \begin{cases} 0, \text{ representing that the } ith \text{ job is not processed in the } rth \text{ batch} \\ 1, \text{ representing that the } ith \text{ job is processed in the } rth \text{ batch} \end{cases};$$

step S7", calculating the optimal maximum lead time $E_{max}$* on each machine according to the steps S1"-S6", and outputting the maximum of $E_{max}$* calculated among all machines as the fitness value $E_{max}$.

4. A scheduling system based on a hybrid variable neighborhood search and gravitational search algorithm, wherein the system comprises a computer, comprising:
  at least one storage unit;
  at least one processing unit; and
  at least one output unit;
  wherein the at least one storage unit stores at least one instruction to be loaded and executed by the at least one processing unit to implement the following steps:
  S1, initializing input parameters of the algorithm, including number of jobs n, basic processing time of a job $p_i$, learning factor a, linear factor of starting time θ, and capacity of a processing machine C;
  S2, setting execution parameters of an improved variable neighborhood search (VNS) algorithm, wherein the VNS algorithm part comprises initial solution $X_s$, maximum iterations $I_{max}$, minimum neighborhood structure index value $o_{min}$, current neighborhood structure index value o, and maximum neighborhood structure index value $o_{max}$; and a local search algorithm part comprises maximum iterations $it_{max}$, current iteration it=1, and population size of the local search algorithm Q, with global optimal solution $X_{best}=X_s$;
  S3, setting o=$o_{min}$;
  S4, randomly selecting Q individuals from the oth neighborhood of the current global optimal solution $X_{best}$ to initialize a population individual set S in local search based on the local search algorithm;
  S5, executing the local search algorithm to obtain a local near-optimal solution X';
  S6, when determining that X' is better than the current global optimal solution $X_{best}$, assigning X' to $X_{best}$, and proceeding to the step S3; otherwise, assigning o+1 to o, and determining whether o is not greater than $o_{max}$, and if yes, proceeding to the step S4; otherwise, proceeding to step S7; and
  S7, assigning I+1 to I, and determining whether I≤$I_{max}$ is true; if yes, performing the step S3; otherwise, terminating the algorithm;
  the at least one output unit is configured to output the current global optimal solution; and
  before the step of randomly selecting Q individuals from the oth neighborhood of the current global optimal solution $X_{best}$ in the step S4 implemented through loading and execution of the at least one instruction by the at least one processing unit, a step of setting a neighborhood structure is further performed;
  wherein the setting the neighborhood structure comprises:
  step S1', defining variables x, y, and g=1, and obtaining the input initial solution X and variable;
  step S2', randomly generating two integers in the range of an interval [1, n] for assigning to x and y;
  step S3', selecting the xth and yth elements in X, and swapping the two elements to obtain a new solution X';
  step S4', let g=g+1, determining whether g≤o is true; if yes, returning to the step S2'; otherwise, performing step S5'; and
  step S5', calculating a fitness value, and determining whether X' is better than the initial solution X; if yes, outputting the solution X'; otherwise, outputting the initial solution X.

5. The system according to claim 4, wherein in the step S5 implemented through loading and execution of the at least one instruction by the at least one processing unit, the process of executing the local search algorithm to obtain the local near-optimal solution X' comprises:
  step S51, randomly selecting Q solutions in a neighborhood of the current global optimal solution as initial solutions of the local search algorithm based on a gravitational search algorithm (GSA), wherein the jth individual in the (it)th generation population of the local search algorithm is defined as $X_j^{it}=\{x_{j1}^{it}, x_{j2}^{it}, \ldots, x_{jd}^{it}, \ldots, x_{jn}^{it}\}$, with 1≤it≤$it_{max}$, j=1, 2, . . . , Q, and d=1, 2 . . . , n, wherein $x_{jd}^{it}$ represents the position of the jth individual in the (it)th generation population in the dth dimension; and let it=1;
  step S52, calculating a fitness value of each individual in the (it)th generation population, wherein the fitness value of the jth individual is denoted as $fit_j(it)$;
  step S53, updating the worst individual worst(it) and the best individual best(it) of the (it)th generation population;
  step S54, calculating the mass of each individual of the current population by the following equations, wherein $M_j(it)$ represents the mass of the jth individual of the current population;

$$m_j(it) = \frac{fit_j - worst(it)}{best(it) - worst(it)}$$

$$M_j(it) = \frac{m_j(it)}{\sum_{j=1}^{Q} m_j(it)};$$

step S55, calculating an acceleration of each individual of the current population in each dimension by the following equations, wherein the acceleration of the jth individual in the dth dimension is denoted as $A_{jd}^{it}$;

$$F_{ij}^d(it) = G(it)\frac{M_j(it) \times M_i(it)}{\|X_j^{it} - X_i^{it}\|_2 + \varepsilon}(x_{jd}^{it} - x_{id}^{it})$$

$$A_{jd}^{it} = \frac{\sum_{i=1, i \neq j}^{N} rand_i F_{ij}^d(it)}{M_j(it)};$$

step S56, updating a position and a speed of each individual of the current population in each dimension by the following equations, wherein the speed of the j th individual in the dth dimension is denoted as $V_{jd}^{it}$;

$$V_{jd}^{it+1} = rand_j \times V_{jd}^{it} + A_{jd}^{it}$$

$$x_{jd}^{it+1} = x_{jd}^{it} + V_{jd}^{it+1}; \text{ and}$$

step S57, determining whether it≤$it_{max}$ is true; if yes, let it=it+1, and proceeding to step S52; otherwise, terminating the algorithm, and outputting the local near-optimal solution.

6. The system according to claim 4, wherein in the step 5' implemented through loading and execution of the at least one instruction by the at least one processing unit, the process of calculating the fitness value comprises:

step S1", sorting a job sequence in a non-decreasing order by processing time, and setting parameter h=1;

step S2", arranging first c jobs of the sequence into the hth batch, and deleting such jobs from a list, thereby obtaining a remaining sequence, and assigning h+1 to h;

step S3", if there still are jobs left in the job sequence, arranging first $$n - \left(\left\lceil \frac{n}{c} \right\rceil - 1\right) c$$

jobs into the hth batch, and deleting such jobs from the list, thereby obtaining a remaining sequence;

step S4", assigning h+1 to h;

step S5", if there still are jobs left in the sequence, arranging first c jobs into the hth batch, and deleting such jobs from the list, thereby obtaining a remaining sequence, and then returning the step S4"; otherwise, performing step S6";

step S6", processing each batch in a batch forming order, and calculating the maximum lead time $E_{max}^*$;

if n<c is true, $E_{max}^*=0$;

otherwise, $$E_{max}^* = d - \frac{1}{(1+\theta)^{\lceil \frac{n}{c} \rceil - 1}}\left[d - \left(\sum_{r=c+1}^{c+n-(\lceil \frac{n}{c} \rceil - 1)c} \sum_{i=1}^{n} p_i^{r^2} x_{ir}(1+\theta)^{\lceil \frac{n}{c} \rceil - 2} + \sum_{k=3}^{\lceil \frac{n}{c} \rceil} \sum_{r=c+n-(\lceil \frac{n}{c} \rceil - 1)c+(k-3)c+1}^{c+n-(\lceil \frac{n}{c} \rceil - 1)c+(k-3)c+c} \sum_{i=1}^{n} p_i^{r^2} x_{ir}(1+\theta)^{\lceil \frac{n}{c} \rceil - k}\right)\right];$$

wherein θ represents a setup time deterioration rate; n represents total number of jobs; c represents the capability of a machine, i.e., maximum number of jobs of each batch; and ⌈x⌉ represents the maximum integer not greater than x; and $$x_{ir} = \begin{cases} 0, \text{ representing that the } ith \text{ job is not processed in the } rth \text{ batch} \\ 1, \text{ representing that the } ith \text{ job is processed in the } rth \text{ batch} \end{cases};$$

step S7", calculating the optimal maximum lead time $E_{max}^*$ on each machine according to the steps S1"-S6", and outputting the maximum of $E_{max}^*$ calculated among all machines as the fitness value $E_{max}$.

7. A computer-readable storage medium that stores at least one instruction to be loaded and executed by a processor to implement the method of claim 1.

\* \* \* \* \*